(12) United States Patent
Osugi et al.

(10) Patent No.: US 11,372,603 B2
(45) Date of Patent: Jun. 28, 2022

(54) IMAGE FORMING APPARATUS AND NON-TRANSITORY COMPUTER READABLE MEDIUM

(71) Applicant: FUJIFILM Business Innovation Corp., Tokyo (JP)

(72) Inventors: Akiyoshi Osugi, Kanagawa (JP); Shungo Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/019,367

(22) Filed: Sep. 14, 2020

(65) Prior Publication Data

US 2021/0294539 A1 Sep. 23, 2021

(30) Foreign Application Priority Data

Mar. 23, 2020 (JP) .............................. JP2020-050541

(51) Int. Cl.
 *G06F 15/00* (2006.01)
 *G06F 3/12* (2006.01)
 *G06K 15/02* (2006.01)

(52) U.S. Cl.
 CPC ............ *G06F 3/122* (2013.01); *G06F 3/1221* (2013.01); *G06K 15/1861* (2013.01)

(58) Field of Classification Search
 CPC .... G06F 3/122; G06F 3/1221; G06K 15/1861
 USPC ......................................................... 358/1.16
 See application file for complete search history.

(56) References Cited

U.S. PATENT DOCUMENTS

| 2015/0331790 | A1* | 11/2015 | Kishi | ................... | G06F 3/1207 711/103 |
| 2016/0139982 | A1* | 5/2016 | Yu | ..................... | G11C 14/0018 714/768 |

FOREIGN PATENT DOCUMENTS

JP 2015141681 8/2015

* cited by examiner

*Primary Examiner* — Mark R Milia
(74) *Attorney, Agent, or Firm* — JCIPRNET

(57) ABSTRACT

An image forming apparatus includes a nonvolatile semiconductor storage device, a memory, and a processor. The processor is configured to exert control in such a manner that, when the nonvolatile semiconductor storage device is notified of deleted file data and a trim command is to be executed, even if an operation on file data stored in the nonvolatile semiconductor storage device is performed in the state in which the operation state of the image forming apparatus is set to the power-saving state, the trim command is not executed on the nonvolatile semiconductor storage device in accordance with the operation performed on file data.

11 Claims, 6 Drawing Sheets

FIG. 6

| OPERATION ON FILE DATA | EXECUTION OF TRIM COMMAND |
|---|---|
| REFERENCE TO FILE DATA | NO |
| WRITING OF FILE DATA | NO |
| DELETION OF FILE DATA (WITHOUT EXECUTION OF PRINT PROCESS) | NO |
| DELETION OF FILE DATA (WITH EXECUTION OF PRINT PROCESS) | YES |

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-050541 filed Mar. 23, 2020.

BACKGROUND

(i) Technical Field

The present disclosure relates to an image forming apparatus and a non-transitory computer readable medium.

(ii) Related Art

Japanese Unexamined Patent Application Publication No. 2015-141681 discloses an information processing apparatus performing the following operations: it is determined whether or not the current job state corresponds to a given job state, by using a management table which is prepared in advance; if the current job state corresponds to the given job state, a semiconductor storage device is optimized. This achieves optimization of the semiconductor storage device minimizing reduction of job productivity even when a job is continuously being performed for a long time.

An image forming apparatus stores various types of file data such as image data by using a nonvolatile semiconductor storage device called a flash memory. When file data is deleted, such an image forming apparatus notifies the flash memory of the deleted file data, and executes a trim command.

However, flash memory has an upper limit of the rewrite count of storage elements. Thus, a frequently-executed trim command may shorten the service life of a flash memory.

SUMMARY

Aspects of non-limiting embodiments of the present disclosure relate to an image forming apparatus and a non-transitory computer readable medium which enable the execution count of a trim command to be reduced when operations on file data stored in a nonvolatile semiconductor storage device are performed, compared with the case in which a trim command is executed on the nonvolatile semiconductor storage device for every file operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a nonvolatile semiconductor storage device, a memory, and a processor. The processor is configured to exert control in such a manner that, when the nonvolatile semiconductor storage device is notified of deleted file data and a trim command is to be executed, even if an operation on file data stored in the nonvolatile semiconductor storage device is performed in a state in which an operation state of the image forming apparatus is set to a power-saving state, the trim command is not executed on the nonvolatile semiconductor storage device in accordance with the operation performed on file data.

BRIEF DESCRIPTION OF THE DRAWINGS

Exemplary embodiment of the present disclosure will be described in detail based on the following figures, wherein:

FIG. 6 is a diagram illustrating an example describing in which case a trim command is executed on an SSD and in which case a trim command is not executed, in accordance with a file operation performed in the power-saving mode.

DETAILED DESCRIPTION

An exemplary embodiment of the present disclosure will be described in detail with reference to the drawings.

Figure 1:
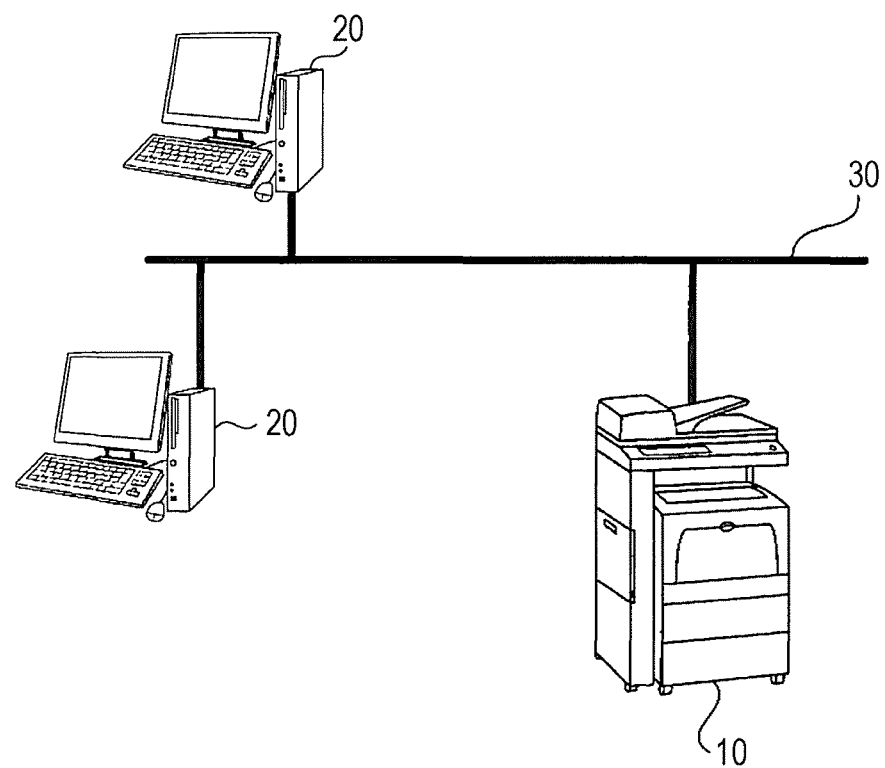
FIG. 1 is a diagram illustrating the system configuration of an image forming system according to an exemplary embodiment of the present disclosure.

FIG. 1 is a diagram illustrating the configuration of an image forming system according to an exemplary embodiment of the present disclosure.

As described in FIG. 1, the image forming system according to an exemplary embodiment of the present disclosure includes an image forming apparatus 10 and terminal apparatuses 20 which are connected to each other over a network 30. The terminal apparatuses 20 generate print data and transmit the generated print data to the image forming apparatus 10 over the network 30. The image forming apparatus 10 receives print data transmitted from the terminal apparatuses 20, and outputs images in accordance with the print data on sheets. The image forming apparatus 10 is a so-called multifunction device having multiple functions, such as the print function, the scan function, the copy function, and the fax function.

Figure 2:
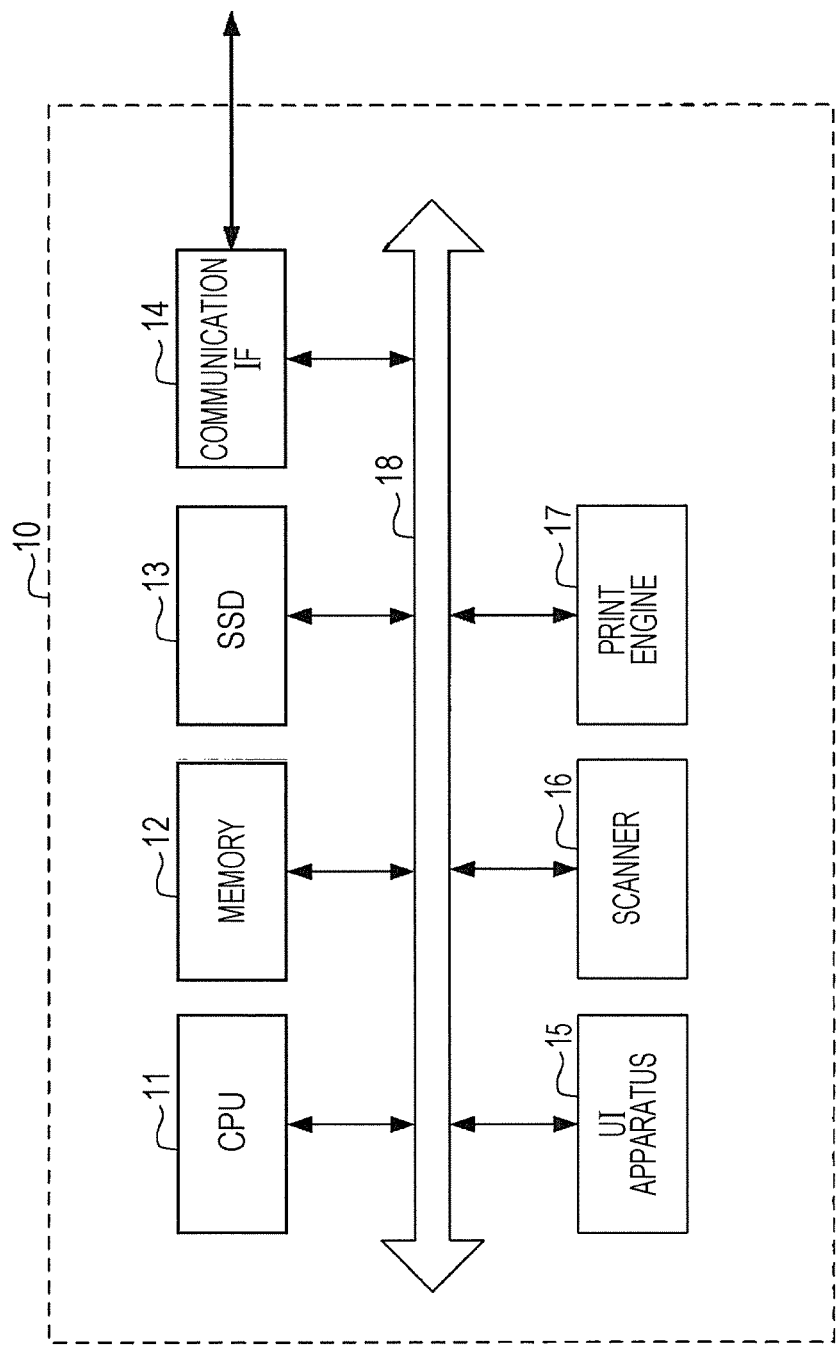
FIG. 2 is a block diagram illustrating the hardware configuration of an image forming apparatus according to an exemplary embodiment of the present disclosure.

FIG. 2 illustrates the hardware configuration of the image forming apparatus 10 in the image forming system according to the exemplary embodiment.

As illustrated in FIG. 2, the image forming apparatus 10 includes a central processing unit (CPU) 11, a memory 12, a solid state drive (SSD) 13, a communication interface (IF) 14 for receiving/transmitting data from/to external apparatuses or the like over the network 30, a user interface (UI) apparatus 15 including a touch panel or a liquid-crystal display and a keyboard, a scanner 16, and a print engine 17. These components are connected to each other through a control bus 18.

The print engine 17 prints images on recording media such as print sheets through processes, such as charging, exposing, developing, transferring, and fixing.

The CPU 11 is a processor which performs given processes on the basis of control programs stored in the memory 12 or the storage device 13 and which controls operations of the image forming apparatus 10. In the exemplary embodiment, a description will be made under the assumption that the CPU 11 reads, for execution, the control programs stored in the memory 12 or the storage device 13. Alternatively, the programs, which are stored in a storage medium such as a compact disc-read-only memory (CD-ROM), may be provided to the CPU 11.

The SSD 13, which is a nonvolatile semiconductor storage device which is called a flash memory, stores various types of file data, such as image data which is being subjected to a print process, document image data which is obtained through reading in a scan process, and image data received by facsimile. The SSD 13 is a NOT-AND (NAND) flash memory, and has a configuration in which data may be erased only block by block.

The SSD 13 includes a storage unit 42 which is formed of a large number of storage elements, and a memory controller 41 which controls writing, reading, and the like of data on the storage unit 42.

Due to its configuration, flash memory has characteristics in which each storage element has an upper limit of its rewrite count. When the rewrite count exceeds the upper limit, a flash memory is dead and is not capable of being used normally.

Therefore, a typical SSD has a function called wear leveling. In wear leveling, data is stored in the storage elements so that their rewrite counts are leveled, achieving a longer service life of the entire device.

Due to the structure of each storage element, NAND flash memory has the following characteristics. In NAND flash memory, stored data is not capable of being overwritten. Thus, data is written only in an area in which data has been erased. As described above, data is erased only storage area by storage area. Such a storage area is large and is called a block.

Therefore, to increase the writing speed, it is necessary to delete unnecessary file data in advance so that each block is empty if possible. In addition, to reduce the processing load of the wear leveling described above, it is necessary to delete unnecessary file data in advance.

Because of this, an SSD has a function called a trim process for erasing file data, which is logically-unnecessary data on the system, from the SSD physically to reduce the processing load described above and improve the performance of the entire SSD.

Specifically, a system notifies its SSD of deleted file data, and executes a trim command. In response to this, the SSD performs a trim process, and erases an area, in which the deleted file data has been stored, block by block. The trim command is a command to instruct an SSD to perform a trim process.

However, as described above, since the rewrite counts of the storage elements in an SSD have an upper limit, too frequent execution of the trim command may make the service life of the SSD short.

Accordingly, for operations performed on file data, which is stored in the SSD 13, over the network 30 in the power-saving mode, the image forming apparatus 10 according to the exemplary embodiment reduces the execution count of the trim command compared with the case in which the SSD 13 performs the trim command for every file operation.

In the SSD 13 according to the exemplary embodiment, the memory controller 41 writes file data in the storage unit 42, and reads file data written in the storage unit 42 on the basis of instructions from an apparatus controller 35. In addition, the memory controller 41 levels the rewrite counts by using the wear leveling described above in such a manner that blocks are used evenly in storing file data. The memory controller 41 also performs a trim process of erasing unnecessary file data on the basis of the trim command from the apparatus controller 35.

Figure 3:
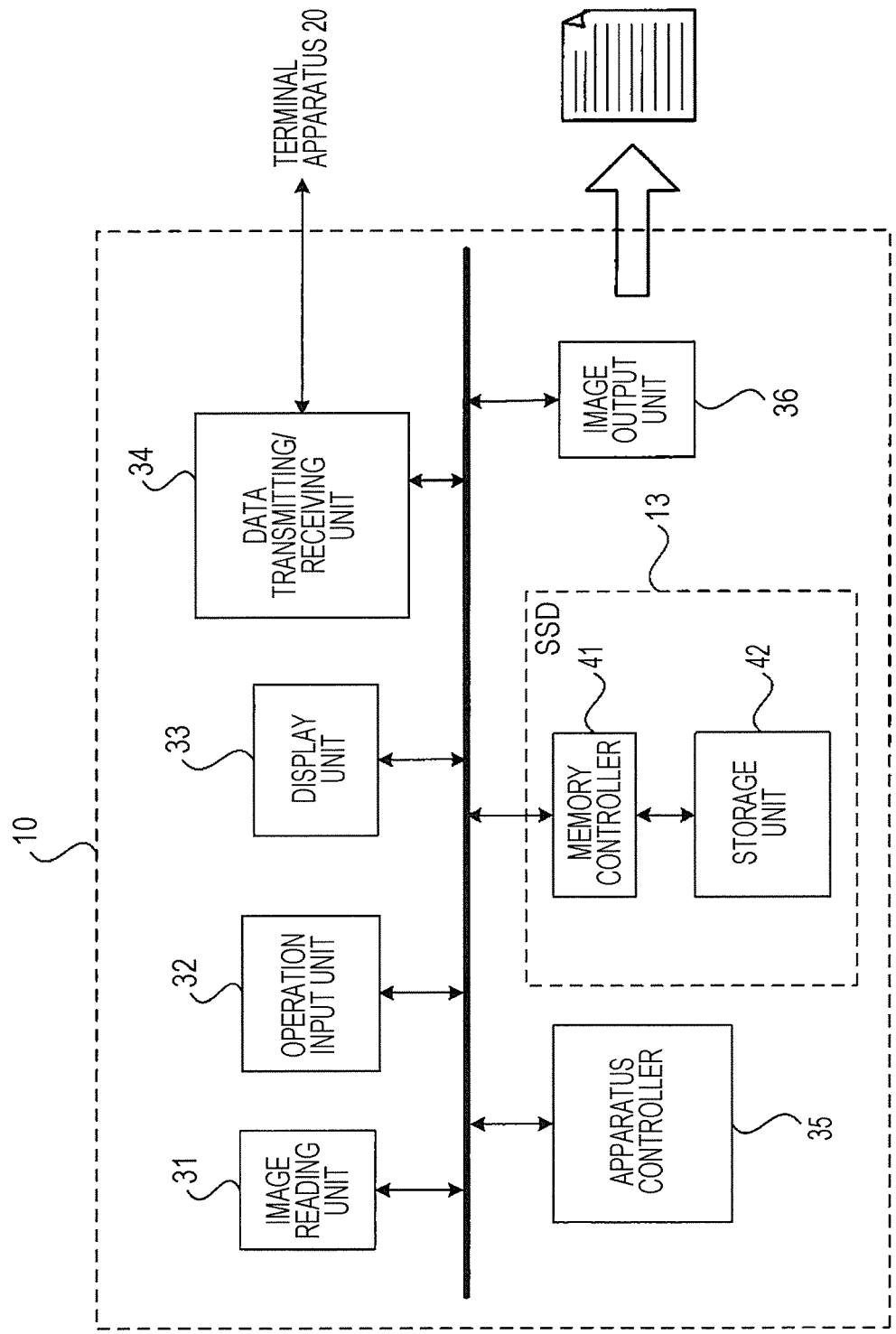
FIG. 3 is a block diagram illustrating the functional configuration of an image forming apparatus according to an exemplary embodiment of the present disclosure.

FIG. 3 is a block diagram illustrating the functional configuration of the image forming apparatus 10 implemented by executing the control programs described above.

As illustrated in FIG. 3, the image forming apparatus 10 according to the exemplary embodiment includes an image reading unit 31, an operation input unit 32, a display unit 33, a data transmitting/receiving unit 34, the apparatus controller 35, an image output unit 36, and the SSD 13.

The data transmitting/receiving unit 34 receives/transmits data from/to external apparatuses such as the terminal apparatuses 20 over the network 30.

The apparatus controller 35 exerts control so that print data is generated on the basis of print jobs, which are received from the terminal apparatuses 20 through the data transmitting/receiving unit 34, and the generated print data is output from the image output unit 36. At that time, the SSD 13 stores various types of data such as print data generated by the apparatus controller 35.

The display unit 33, which is controlled by the apparatus controller 35, displays various types of information to users. The operation input unit 32 receives input of various types of information about operations performed by users.

The image output unit 36 outputs images on recording media such as print sheets on the basis of control of the apparatus controller 35. The image reading unit 31 reads document images from documents, which are set, on the basis of control of the apparatus controller 35.

The apparatus controller 35 notifies the SSD 13 of deleted file data and executes the trim command. At that time, even when an operation on file data stored in the SSD 13 is performed over the network 30 in the state in which the operation state of the image forming apparatus 10 is set to the power-saving mode, the apparatus controller 35 exerts control so that, in accordance with the operation on file data, the trim command is not executed on the SSD 13.

The image forming apparatus 10 according to the exemplary embodiment switches the operation mode between two operation modes, the normal operation mode (also called the normal operation state) and the power-saving mode (also called the power-saving state). The normal operation mode is an operation state in which the power supply of the image reading unit 31, the image output unit 36, the operation input unit 32, the display unit 33, and the SSD 13 is switched on, and in which all of the functions of the apparatus are available. The power-saving mode is an operation state in which the power supply of the image reading unit 31, the image output unit 36, the display unit 33, and the SSD 13 is switched off, and in which only the apparatus controller 35, the operation input unit 32, and the data transmitting/receiving unit 34 operate. The power-saving mode may be any as long as the power-saving mode is an operation mode in which power consumption is reduced compared with that in the normal operation mode. Therefore, the power-saving mode is not limited to a mode in which all the power supply of the image reading unit 31, the image output unit 36, the display unit 33, and the SSD 13 is switched off. For example, the power-saving mode may be a mode in which the power supply of the image reading unit 31, the image output unit 36, and the SSD 13 is switched off, while the power supply of the display unit 33 is switched on. That is, the power-saving mode may indicate any state as long as the power-saving mode is an operation mode in which the power supply of a subset of the devices in the apparatus is switched off to reduce the power consumption.

When neither an operation performed by a user nor reception of a print job are performed for a predetermined time or more in the normal operation mode, the apparatus controller 35 switches the operation mode to the power-saving mode. In the power-saving mode, when some user operation is performed on the operation input unit 32 or a print job is received through the data transmitting/receiving unit 34, the apparatus controller 35 switches the operation mode to the normal operation mode.

The apparatus controller 35 executes the trim command on the SSD 13 at a timing at which the operation mode of the image forming apparatus 10 is switched from the normal operation mode to the power-saving mode.

In the case where the operation mode of the image forming apparatus 10 is set to the power-saving mode, when file data stored in the SSD 13 is deleted over the network 30 with execution of a print process, the apparatus controller 35 switches the operation mode of the image forming apparatus 10 from the power-saving mode to the normal operation mode, and prints the file data.

Therefore, assume the case in which the apparatus controller 35 prints the file data, and in which the condition, which causes switching to the power-saving mode, is then satisfied. In this case, in switching the operation mode from the normal operation mode to the power-saving mode, the apparatus controller 35 executes the trim command on the SSD 13.

That is, when a file operation, which is to cause the trim command to be executed, is performed, the apparatus controller 35 exerts control so that the operation mode is switched from the power-saving mode to the normal operation mode to execute the trim command.

In the case where the operation mode of the image forming apparatus 10 is set to the power-saving mode, when file data stored in the SSD 13 is deleted over the network 30 without execution of a print process, the apparatus controller 35 activates the SSD 13 by switching on the power supply of the SSD 13, and deletes the file data. After that, the operation mode of the image forming apparatus 10 continues to be the power-saving mode.

In the case where the operation mode of the image forming apparatus 10 is set to the power-saving mode, when file data stored in the SSD 13 is referred to over the network 30 or new file data is added to the SSD 13 over the network 30, the apparatus controller 35 activates the SSD 13 and performs the corresponding operation. After that, the operation mode of the image forming apparatus 10 continues to be the power-saving mode.

Operations in the image forming apparatus 10 according to the exemplary embodiment will be described in detail by referring to the drawings.

Figure 4:
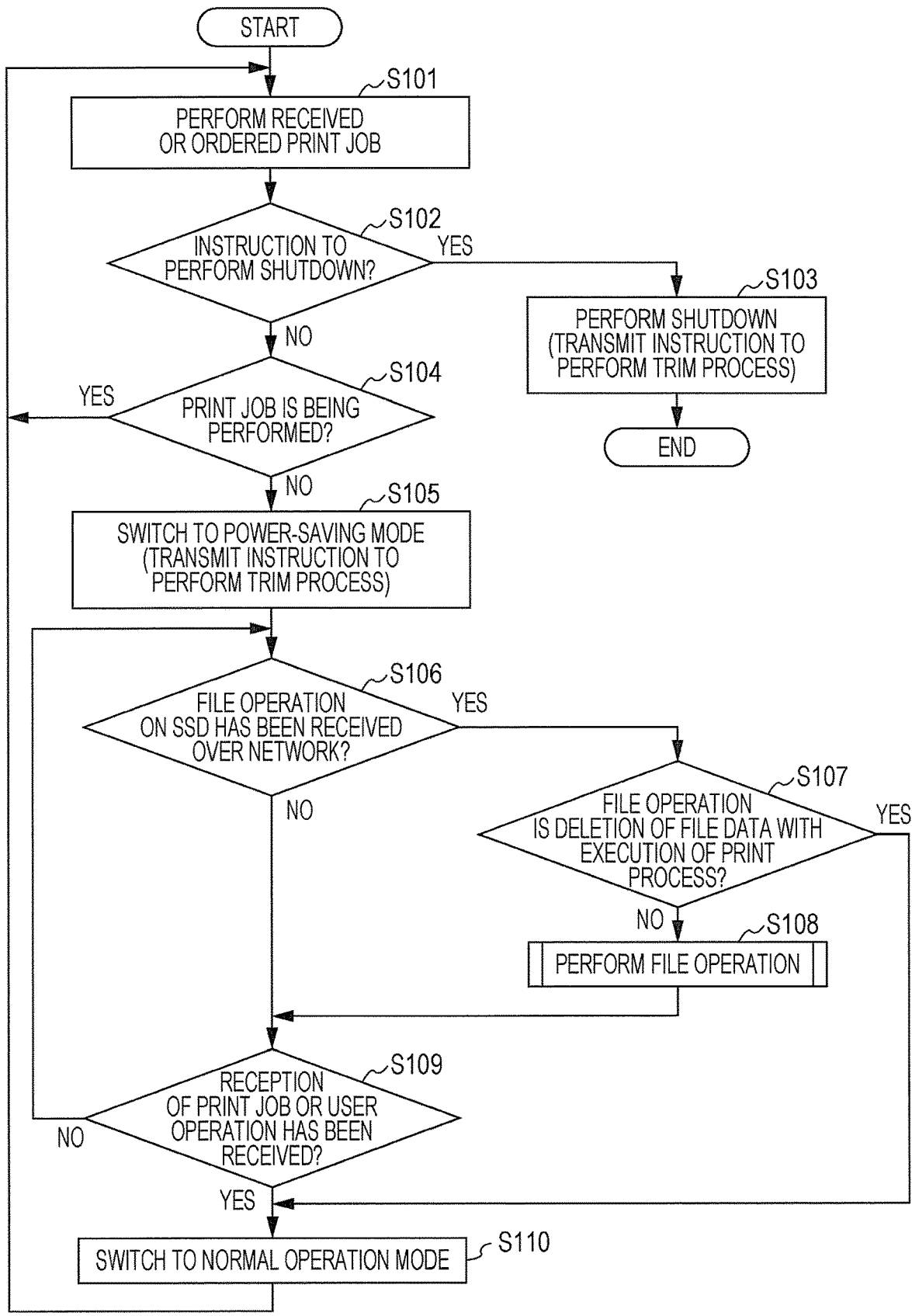
FIG. 4 is a flowchart of operations of an image forming apparatus according to an exemplary embodiment of the present disclosure.

By referring to the flowchart in FIG. 4, operations, which are performed when the image forming apparatus 10 according to the exemplary embodiment executes, on the SSD 13, the trim command for transmitting an instruction to perform a trim process, will be described.

As described above, in the image forming apparatus 10 according to the exemplary embodiment, when the apparatus controller 35 switches the operation mode from the normal operation mode to the power-saving mode, the apparatus controller 35 executes the trim command for instructing the SSD 13 to perform a trim process. Also in a shutdown process performed when the power supply switch of the apparatus is operated to perform a shutdown, the apparatus controller 35 executes the trim command.

When the trim command is not executed because a shutdown process is not performed normally, the apparatus controller 35 may execute the trim command in a startup process to stable the operation of the SSD 13 after the startup.

When the trim command is executed in switching to the power-saving mode, the apparatus controller 35 interrupts the power supply of the image reading unit 31, the display unit 33, and the image output unit 36, and notifies the SSD 13 of the deleted file data and executes the trim command. After that, the apparatus controller 35 also switches off the power supply of the SSD 13.

The operations of the apparatus controller 35 will be described according to the flowchart in FIG. 4.

In step S101, the apparatus controller 35 performs various jobs, such as a print job received from a terminal apparatus 20 and a print job based on an instruction from the operation input unit 32. If the result from the determination process in step S104 indicates that such a print job is being processed or that a print job has been received, the apparatus controller 35 performs the various jobs in the normal operation mode which is set as the operation mode If, as illustrated in step S102, an instruction to perform a shutdown process is transmitted in the normal operation mode, the apparatus controller 35 performs a shutdown process in step S103, and executes the trim command at that time.

If neither reception of a print job nor execution of a user operation has been performed for the predetermined time in the normal operation mode, in step S105, the apparatus controller 35 switches the operation mode from the normal operation mode to the power-saving mode, and executes the trim command on the SSD 13 at that time.

Until the result from the determination process in step S109 indicates that reception of a print job or execution of a user operation has occurred, the apparatus controller 35 continues to set the operation mode to the power-saving mode.

However, in the power-saving mode, as illustrated in step S106, if some operation is performed over the network on file data stored in the SSD 13, in step S107, the apparatus controller 35 determines whether or not the file operation indicates deletion of file data with execution of a print process.

In step S107, if the file operation indicates deletion of file data with execution of a print process, in step S110, the apparatus controller 35 switches the operation mode to the normal operation mode, and causes the process to return to step S101.

For example, if an instruction to output file data, which is stored in the SSD 13, from the image output unit 36 is transmitted, the file data is deleted after the image output unit 36 outputs the file data normally. Thus, such a file operation indicates deletion of file data with execution of a print process.

If an instruction to simply delete file data stored in the SSD 13 is transmitted, such a file operation indicates deletion of file data without execution of a print process.

In step S107, if the file operation indicates deletion of file data without execution of a print process, in step S108, the apparatus controller 35 performs the file operation. In this case, the apparatus controller 35 continues to set the operation mode to the power-saving mode.

Figure 5:
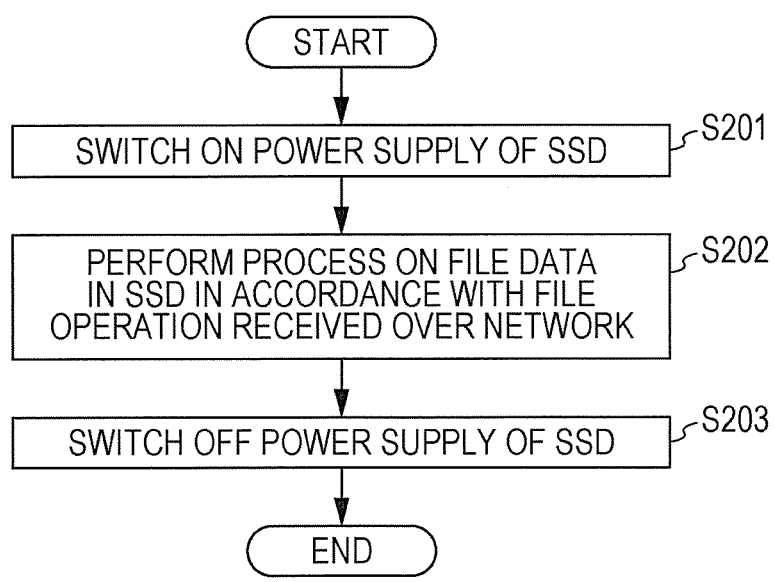
FIG. 5 is a flowchart for describing the details of a file operation process, which is described in step S108 in the flowchart in FIG. 4, on a solid state drive (SSD)

Execution of a file operation on the SSD 13 in step S108 will be described by referring to the flowchart in FIG. 5.

In step S201, the apparatus controller 35 switches on the power supply of the SSD 13. In step 202, the apparatus controller 35 performs a process on the file data in the SSD 13 in accordance with the file operation received over the network.

For example, if the file operation received from a terminal apparatus 20 over the network 30 indicates reference to file data, the apparatus controller 35 refers to the file data in the SSD 13, and returns the reference result to the terminal apparatus 20. If the file operation received from a terminal apparatus 20 over the network 30 indicates addition of new file data, the apparatus controller 35 stores the added file data newly in the SSD 13.

If the file operation received from a terminal apparatus 20 over the network 30 indicates deletion of file data, the apparatus controller 35 deletes the file data stored in the SSD 13.

Deletion of file data stored in the SSD 13 means that the apparatus controller 35 deletes management information for managing the file data in the SSD 13, and the file data in the storage unit 42 of the SSD 13 is not deleted physically.

In step S203, the apparatus controller 35 switches off the power supply of the SSD 13, and continues to set the operation mode to the power-saving mode.

Thus, even when a file operation on file data in the SSD 13 is performed over the network 30 in the power-saving mode, if the file operation indicates reference or addition of file data, or deletion of file data without execution of a print process, the operation mode continues to be the power-saving mode, and the trim command is not executed on the SSD 13.

In contrast, when a file operation on file data in the SSD 13 is performed over the network 30 in the power-saving mode, if the file operation indicates deletion with execution of a print process, the operation mode is switched to the normal operation mode. Thus, switching to the normal operation mode is performed, and a print process is performed. In switching back to the power-saving mode, the trim command is executed on the SSD 13.

That is, when a file operation on file data stored in the SSD 13 is performed over the network 30 in the power-saving mode, the trim command is, in some cases, executed and is, in some cases, not executed on the SSD 13 in accordance with the file operation.

FIG. 6 illustrates a table describing such cases. FIG. 6 illustrates the relationship between operation on file data stored in the SSD 13 and whether or not the trim command is executed.

FIG. 6 shows that, when an operation on file data in the SSD 13 in the power-saving mode indicates reference or writing of file data or deletion of file data without execution of a print process, the trim command is not executed on the SSD 13.

FIG. 6 shows that, when an operation on file data in the SSD 13 in the power-saving mode indicates deletion with execution of a print process, the trim command is executed on the SSD 13.

The reason why the trim command is executed when an operation on file data indicates deletion with execution of a print process will be described below.

When an instruction to print certain file data is transmitted, for example, image data based on the file data, for which the print instruction has been transmitted, is converted to raster print data. During such a conversion process, various types of data such as temporary data are stored in the storage unit 42 of the SSD 13. Therefore, when a print process on certain file data is performed, various types of unnecessary data are stored in the storage unit 42 of the SSD 13.

Thus, when a process such as a print process on certain file data is performed, execution of a trim process causes various types of unnecessary data, which are stored in the storage unit 42, to be erased, increasing the number of empty blocks in the storage unit 42. Thus, the processing load produced in wear leveling in the SSD 13 is also reduced, and the data deletion count is reduced, resulting in a longer service life of the SSD 13.

An operation of referring to file data stored in the SSD 13 or an operation of adding new file data to the SSD 13 does not cause deletion of data originally. In this case, execution of the trim command on the SSD 13 does not produce marked effect.

When deletion without execution of a print process, such as simple deletion of file data stored in the SSD 13, is performed, the amount of data, which is to be deleted, may be smaller, in most cases, than that in the case in which a print process is performed. Therefore, execution of no trim command after such deletion of file data is unlikely to decrease the performance of the SSD 13 by a large amount. Accordingly, the apparatus controller 35 does not execute the trim command at a timing of such deletion of file data, and executes the trim command on the basis of another process after switching to the normal operation mode.

In the exemplary embodiment, when deletion of file data with execution of a print process, that is, some job process, occurs over the network in the power-saving mode, the apparatus controller 35 switches the operation mode to the normal operation mode, and executes the trim command. Such determination in accordance with an operation is merely exemplary. When a certain file operation is performed over the network in the power-saving mode, the apparatus controller 35 may determine whether the operation mode continues to be the power-saving mode, or the operation mode is to be switched to the normal operation mode, in accordance with a file operation in any way.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a nonvolatile semiconductor storage device;
a memory; and
a processor, wherein the processor is configured to exert control in such a manner that, when the nonvolatile semiconductor storage device is notified of deleted file data and a trim command is to be executed, even if an operation on file data stored in the nonvolatile semiconductor storage device is performed in a state in which an operation state of the image forming apparatus is set to a power-saving state, the trim command is not executed on the nonvolatile semiconductor storage device in accordance with the operation performed on file data, the processor is configured to, if the file data stored in the nonvolatile semiconductor storage device is deleted over a network with execution of a print process when the operation state of the image forming apparatus is the power-saving state, switch the operation state of the image forming apparatus from the power-saving state to a normal operation state, and perform the print process on the file data.

2. The image forming apparatus according to claim 1, wherein the processor is configured to execute the trim command on the nonvolatile semiconductor storage device at a timing at which the operation state of the image forming apparatus is switched from the normal operation state to the power-saving state.

3. The image forming apparatus according to claim 2, wherein the processor is configured to exert control in such a manner that, if the operation on file data stored in the nonvolatile semiconductor storage device is performed over the network in the state in which the operation state of the image forming apparatus is set to the power-saving state, the trim command is not executed on the nonvolatile semiconductor storage device in accordance with the operation.

4. The image forming apparatus according to claim 3, wherein the processor is configured to, if the file data stored in the nonvolatile semiconductor storage device is deleted over the network without execution of the print process when the operation state of the image forming apparatus is the power-saving state, activate the nonvolatile semiconductor storage device, delete the file data, and then cause the operation state of the image forming apparatus to continue to be the power-saving state.

5. The image forming apparatus according to claim 4, wherein the processor is configured to, if the operation is to refer to file data stored in the nonvolatile semiconductor storage device or to add new file data to the nonvolatile semiconductor storage device and is performed over the network when the operation state of the image forming apparatus is the power-saving state, activate the nonvolatile semiconductor storage device, perform the operation, and then cause the operation state of the image forming apparatus to continue to be the power-saving state.

6. The image forming apparatus according to claim 1, wherein the nonvolatile semiconductor storage device is a NAND flash memory in which data is erased only block by block, and wherein the nonvolatile semiconductor storage device erases an area block by block on a basis of the trim command executed by the processor, the area being an area in which deleted file data is stored.

7. The image forming apparatus according to claim 2, wherein the nonvolatile semiconductor storage device is a NAND flash memory in which data is erased only block by block, and wherein the nonvolatile semiconductor storage device erases an area block by block on a basis of the trim command executed by the processor, the area being an area in which deleted file data is stored.

8. The image forming apparatus according to claim 3, wherein the nonvolatile semiconductor storage device is a NAND flash memory in which data is erased only block by block, and wherein the nonvolatile semiconductor storage device erases an area block by block on a basis of the trim command executed by the processor, the area being an area in which deleted file data is stored.

9. The image forming apparatus according to claim 4, wherein the nonvolatile semiconductor storage device is a NAND flash memory in which data is erased only block by block, and wherein the nonvolatile semiconductor storage device erases an area block by block on a basis of the trim command executed by the processor, the area being an area in which deleted file data is stored.

10. A non-transitory computer readable medium storing a program causing a computer to execute a process comprising:

notifying a nonvolatile semiconductor storage device of deleted file data and executing a trim command; and in a case where an operation state of an image forming apparatus is a power-saving state, exerting control to not execute the trim command on the nonvolatile semiconductor storage device even if an operation on file data stored in the nonvolatile semiconductor storage device is performed, the control being exerted in accordance with the operation on the file data; and if the file data stored in the nonvolatile semiconductor storage device is deleted over a network with execution of a print process when the operation state of the image forming apparatus is the power-saving state, switching the operation state of the image forming apparatus from the power-saving state to a normal operation state, and performing the print process on the file data.

11. An image forming apparatus comprising:

means for, in a case where an operation state of the image forming apparatus is a power-saving state when a nonvolatile semiconductor storage device is notified of deleted file data and a trim command is to be executed, exerting control to not execute the trim command on the nonvolatile semiconductor storage device even if an operation on file data stored in the nonvolatile semiconductor storage device is performed, the control being exerted in accordance with the operation performed on the file data, the nonvolatile semiconductor storage device being included in the image forming apparatus; and if the file data stored in the nonvolatile semiconductor storage device is deleted over a network with execution of a print process when the operation state of the image forming apparatus is the power-saving state, switching the operation state of the image forming apparatus from the power-saving state to a normal operation state, and performing the print process on the file data.

* * * * *